United States Patent [19]

McEachern et al.

[11] Patent Number: 5,408,523
[45] Date of Patent: Apr. 18, 1995

[54] ELECTRONIC REMOTE DATA RECORDER WITH FACSIMILE OUTPUT FOR UTILITY AC POWER SYSTEMS

[75] Inventors: Alexander McEachern, Oakland; Scott C. Terry, Pleasanton; Jamie Nicholson, Foster City, all of Calif.; Erich W. Gunther, Knoxville, Tenn.

[73] Assignee: Basic Measuring Instruments, Inc., Santa Clara, Calif.

[21] Appl. No.: 901,737

[22] Filed: Jun. 22, 1992

[51] Int. Cl.⁶ .......................................... H04M 11/00
[52] U.S. Cl. .................................. 379/100; 379/106; 379/107; 340/870.02; 358/442
[58] Field of Search ............. 379/100, 106, 107, 102, 379/104, 105, 97, 98, 92, 93; 340/870.02; 358/442, 400, 401

[56] References Cited

U.S. PATENT DOCUMENTS

| | | | |
|---|---|---|---|
| 4,833,618 | 5/1989 | Verma et al. | 379/107 |
| 4,847,892 | 7/1989 | Shelley | 379/92 |
| 4,850,010 | 7/1989 | Stanbury et al. | 379/107 |
| 4,862,493 | 8/1989 | Venkataraman et al. | 397/107 |
| 4,866,761 | 9/1989 | Thornborough et al. | 379/107 |
| 4,872,195 | 10/1989 | Leonard | 379/40 |
| 4,974,255 | 11/1990 | Defay et al. | 379/106 |
| 4,995,109 | 2/1991 | Arizumi et al. | 379/107 |
| 4,996,703 | 2/1991 | Gray | 379/106 |
| 5,010,568 | 4/1991 | Merriam et al. | 379/107 |
| 5,018,192 | 5/1991 | Smith | 379/107 |
| 5,046,084 | 9/1991 | Barrett et al. | 379/100 |
| 5,053,766 | 10/1991 | Ruiz-del-Portal et al. | 379/106 |
| 5,061,916 | 10/1991 | French et al. | 379/106 |

OTHER PUBLICATIONS

"Damar System Report" SYGNUS Controls, Inc. Jan. 26, 1990.

Primary Examiner—Curtis Kuntz
Assistant Examiner—Stella L. Woo
Attorney, Agent, or Firm—Haverstock, Medlen & Carroll

[57] ABSTRACT

A stand-alone electronic measuring instrument for measuring AC (alternate current) power parameters on a utility distribution system wherein the measurement results are communicated telephonically to a facsimile device. Well-known techniques are used to acquire and accumulate analog signals representative of voltages and currents on an AC power system and digital signals. If the signals exceed a programmed threshold, or if an interval of time elapses, or if some other triggering even occurs, the instrument prepares a bit-mapped digital report on its accumulated input signals which may contain text, graphics, or both. The instrument then employs well-known techniques to telephonically transmit this report directly to a facsimile receiver without employing an intervening computer system.

1 Claim, 5 Drawing Sheets

ELECTRONIC REMOTE DATA RECORDER WITH FACSIMILE OUTPUT FOR UTILITY AC POWER SYSTEMS

BACKGROUND OF THE INVENTION

1. Field of the Invention

This invention relates to electronic measuring apparatus. More specifically, this invention relates to a stand-alone electronic measuring apparatus for utility AC power systems incorporating analog voltage and current inputs, digital inputs, trigger event processing, and coupling to telephonic facsimile apparatus without an intervening computer system.

2. Background of the Invention

It is often necessary to read the results of an instrument on a utility power distribution system at some distance from where it is located. For example, the power flow through a particular transformer may be read by an operator at an office miles away, or the power factor of a branch circuit leaving a substation may be checked electronically without physically visiting the substation. Early remote instruments were connected to their output devices by direct cables. More recent instruments may employ communication techniques such as power line carrier, radio transmission, or the telephone switching network to transmit their readings.

If an instrument is read frequently enough, it may be appropriate to install a remote output device that is dedicated to the instrument. But if the information from the instrument is required infrequently, it is common practice to employ an output device, typically a computer, that can be shared between several instruments. For example, a single personal computer can easily be employed to occasionally interrogate and report on the status of several power quality instruments on a single power distribution network. This approach works well with many kinds of measurements.

However, if the instruments are a trigger-type instruments (that is, they are instruments that need to report their data at unpredictable intervals) with limited ability to store the measurements, a remote output device, typically a personal computer, must be standing by at all times to receive the measurements, or data may be lost. For example, if the instrument is an AC power system lightning strike recorder with sufficient storage space for data about a single lightning strike, and it records a strike, it must either be able to communicate its measurements to its remote output device before it detects a second lightning strike or lose its data about subsequent lightning strikes.

At utility companies, it is often difficult to economically justify dedicating a personal computer to standby communications from instruments, especially if the communication are infrequent. Even when a personal computer can be justified, it is often difficult to economically justify the associated outside telephone line required for that computer.

In some systems, such as the one disclosed by French et al. in U.S. Pat. No. 5,061,916, the output of remote instruments in a building automation system are coupled to a central control computer which in turn generates and transmits a report to a standard facsimile apparatus. This approach succeeds in remotely presenting the data collected by the instruments, but does not succeed in eliminating the requirement to dedicate a personal computer and its associated communication network to standby communications from instruments.

When making remote AC power system measurements, it is often necessary to check the measured data at an arbitrary time. For example, a utility company may receive an urgent telephone call from a customer requesting information about power line disturbances that have taken place in the last fifteen minutes. In situations like this, the user of a remote AC power measurement system may need to request that the remote sensor provide a report immediately, whether or not any triggering event has occurred.

The French reference does not disclose any method for instructing their building automation system to generate a report in response to a request signal.

The present invention solves the problem of requiring a standby computer by coupling the output of a remote AC power instrument directly to a facsimile apparatus via the telephone system without an intervening computer.

The present invention solves the problem of generating a report in response to a request signal by instructing the remote instrument to generate and transmit a report whenever it receives a phone communication that it cannot otherwise process, thus allowing a user to trigger a report by simply telephoning the instrument, waiting for it to answer, then hanging up.

DETAILED DESCRIPTION OF A PREFERRED EMBODIMENT

Figure 1:
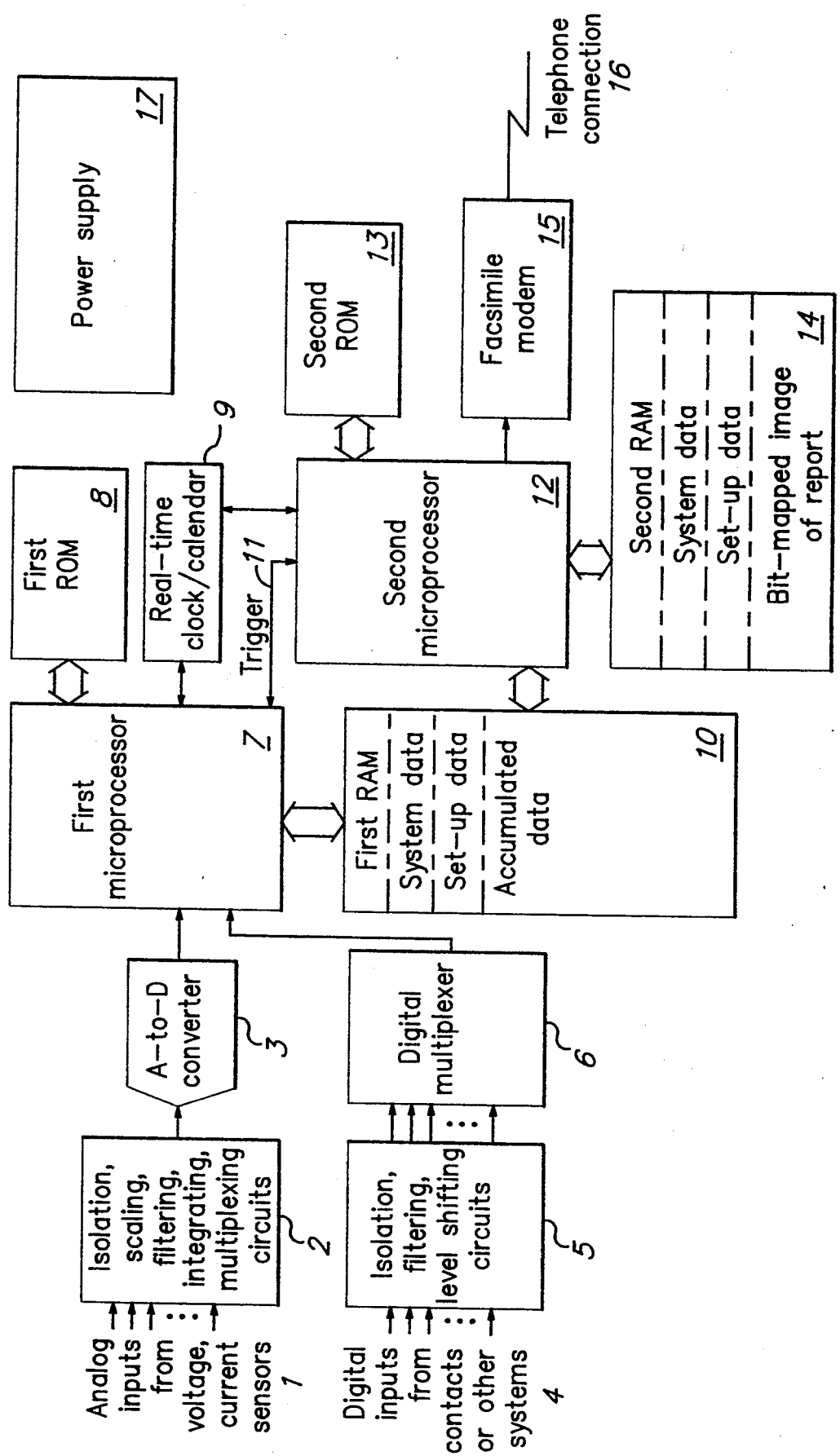
FIG. 1 shows a block diagram of an embodiment of the invention.

Beginning at the far left of FIG. 1, analog signals from utility distribution-system voltage and current sensors 1 are applied to isolation, scaling, filtering, integrating and multiplexing circuits 2 that employ any well-known techniques to isolate appropriate voltage levels, scale the signals to an appropriate level for further processing, filter out frequencies that are not of interest, integrate the resulting signal over time, and present appropriately multiplexed signals to an Analog to Digital converter 3. Digital signals from switch contacts such as power system protective relays and the like 4 are applied to isolating, filtering, and level shifting circuits 5 that employ any well-known techniques to isolate appropriate voltage levels, filter out frequencies that are not of interest, shift voltage logic to an appropriate level, and present the logic signals to a digital multiplexed 6. The outputs of the Analog to Digital converter 3 and the digital multiplexed 6 are applied to a first microprocessor 7.

Figure 4:
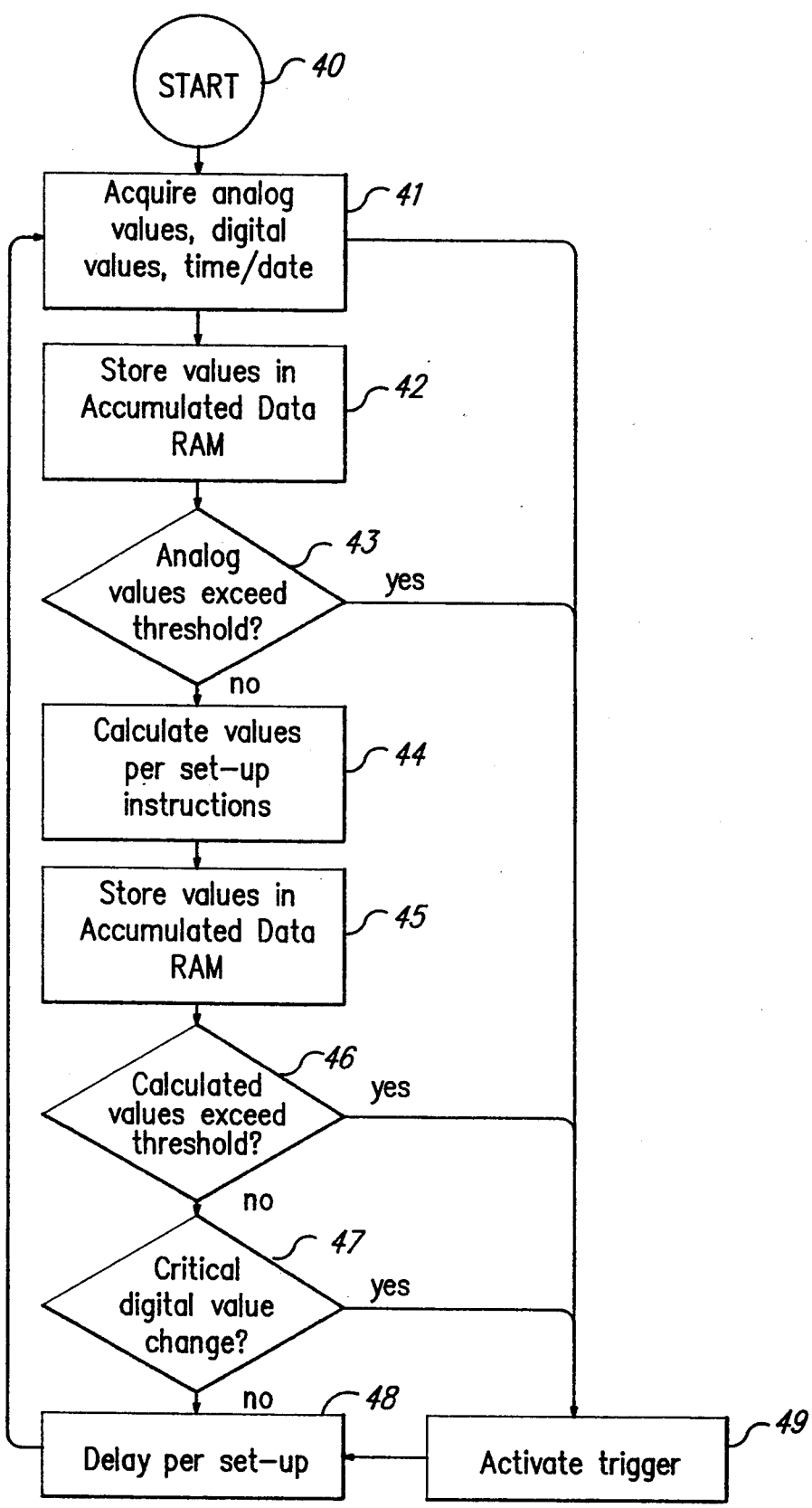
FIGS. 4 and 5 show flow diagrams of algorithms executed by the microprocessors in the invention.

The first microprocessor 7 employs a first read-only memory (ROM) 8, a first random-access memory (RAM) 10, and a real-time clock/calendar 9 to execute an algorithm shown in FIG. 4. This algorithm has two outputs: accumulated power parameter measurement data stored in the first RAM 10, and detection of a trigger even which activates a bidirectional signal line 11 connected to a second microprocessor 12.

The first RAM 10 contains system data such as stacks and pointers, setup data such as thresholds and scaling factors, and accumulated measurement data.

Figure 5:
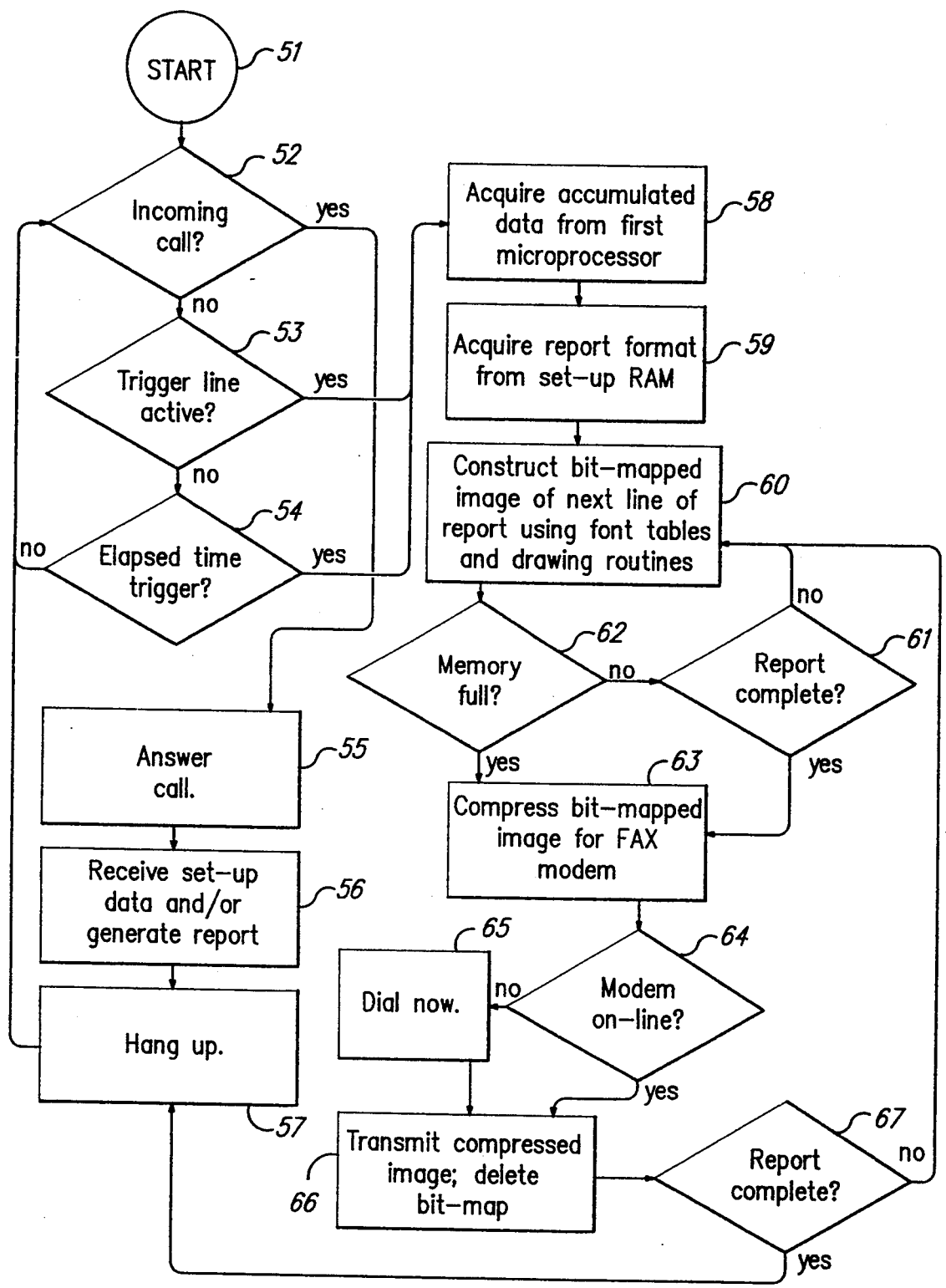

The second microprocessor 12 employs the second ROM 13, the second RAM 14, and the real-time clock/-calendar 9 to execute an algorithm shown in FIG. 5.

Figure 2:
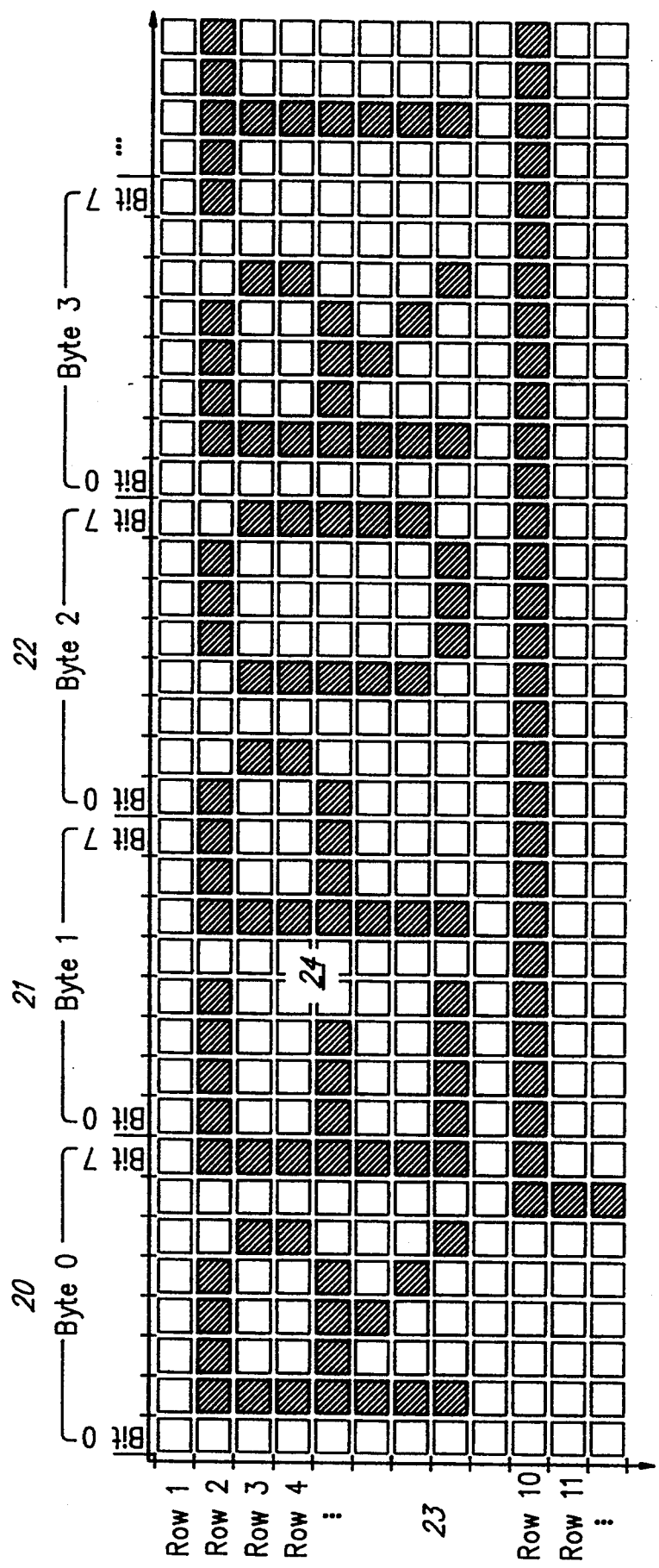
FIG. 2 shows the top left corner of a bit-mapped report prepared by the invention.

The second RAM 14 contains system data such as stacks and pointers, setup data such as telephone numbers and facsimile header information, and space for a bit-mapped image of a report such as the one shown in FIG. 2, or a portion thereof.

When the second microprocessor 12 either detects or creates a trigger event on the bidirectional signal line 11, the algorithm in FIG. 5 causes a pixel-by-pixel bit-map of a report to be created in the second RAM 14. This report is based on data accumulated by the first microprocessor 7 in the first RAM 10. Once a bit-map of the report, or a portion thereof, is stored in the second RAM 14, the second microprocessor causes the facsimile modem 15 to employ any well-known technique to cause the bit-map report stored in the second RAM 14 to be transmitted through a telephone connection 16 to a standard facsimile receiver which then prints the report.

The second microprocessor 12 is also capable of receiving set-up data from a controlling computer through the facsimile modem 15. This setup data, stored in the second RAM 14, includes thresholds, the telephone number of the facsimile apparatus which is designated to receive reports from this instrument, and header information for the facsimile reports prepared by this instrument such as the name and office location of the individual to whom the report is to be sent.

The second microprocessor 12 is also capable of initiating a trigger event whenever it receives a phone call that it cannot otherwise process. This permits the user of the instrument to request a facsimile report simply by dialing the telephone number of the instrument.

A power supply 17 employs well-known techniques to provide power to the microprocessor-based system. It includes long-term battery support for the real-time clock/calendar 9 and the data in the first RAM 10 and second RAM 14, and short-term battery support for the entire instrument so that it can communicate during power failures.

Turning now to FIG. 2, we see the top left corner of a typical pixel-by-pixel bit-map of a report prepared by the second microprocessor 12 and stored in the second RAM 14. Each byte of memory 20, 21, 22 contains eight bits in which a "zero" corresponds to white and a "one" corresponds to black. Each pixel row 23 of the report consists of 256 bytes which may contain black pixels and white pixels 24. The pixels are set in such a way that the sequence of pixel rows 23 form letters, numbers, and punctuation marks or form graphic elements such as lines, shaded areas, and charts. The pixels in FIG. 2 show the word "REPORT" and the upper portion of a graphic data presentation.

Figure 3:
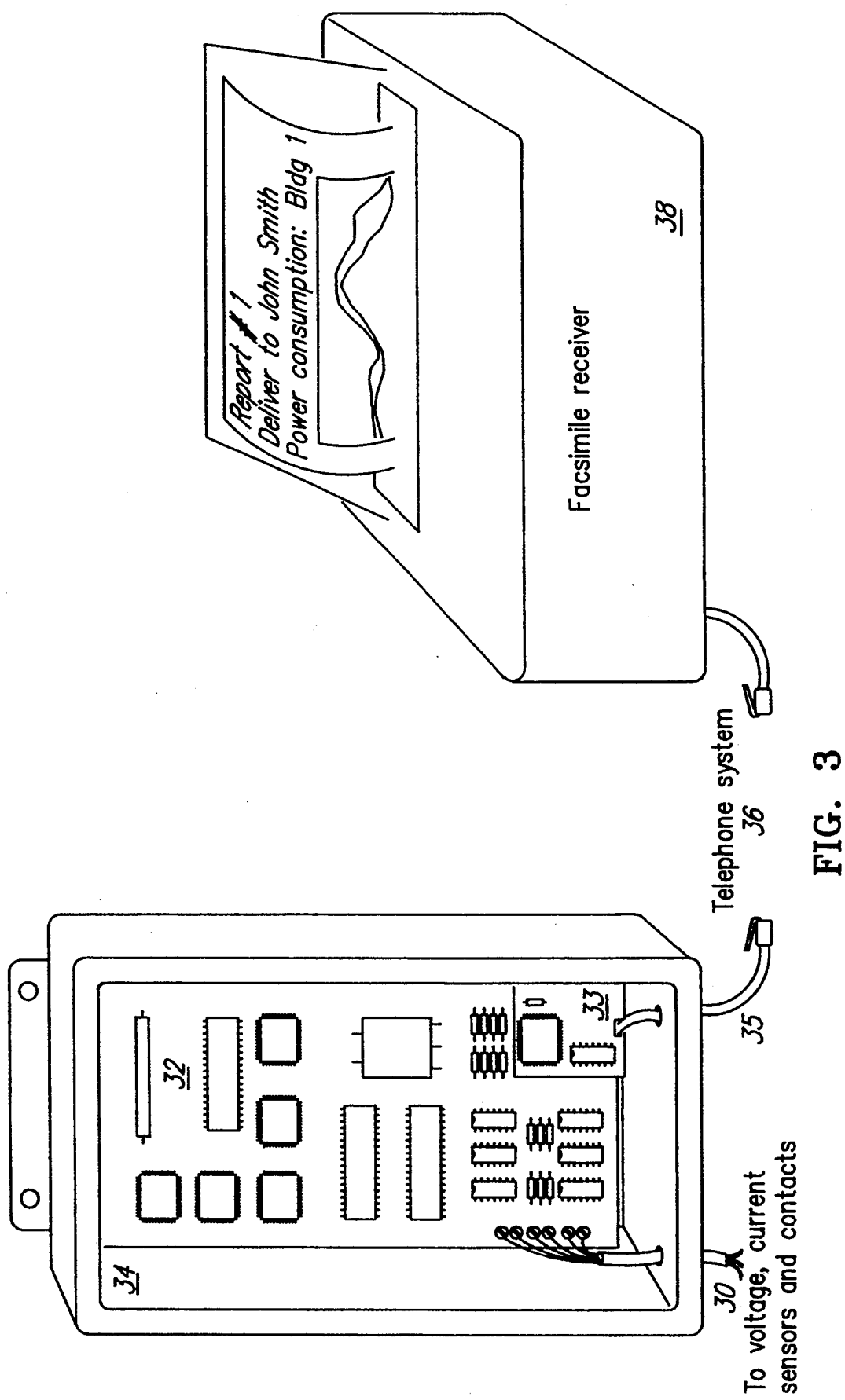
FIG. 3 shows the invention operating in conjunction with a facsimile apparatus.

Turning now to FIG. 3, we see an overview of the instrument in operation. The instrument 34 receives input signals from voltage and current sensors and contacts on cable 30. A printed wiring board 32 contains the two microprocessors 7, 12 of FIG. 1 and all their associated circuitry. The facsimile modem 15 of FIG. 1 is contained on a separate printed wiring board 33, and connects through cable 35 to the telephone system 36. Signals sent by facsimile modem 33 through the cable 35 to the telephone system 36 are received and printed by a standard facsimile receiver 38.

Turning now to FIG. 4, we see a flow diagram of the algorithm executed by the first microprocessor 7 of FIG. 1. The algorithm enters a loop at START 40. In block 41 it acquires the values of all of the analog inputs from sensors 1, and it acquires all of the digital values from switch contacts or other systems 4, and it acquires the time and date of this set of samples from the real-time clock/calendar 9. Block 42 stores the values that were acquired in Block 41 in the Accumulated Data RAM 10. Block 43 inspects the analog values and compares them with thresholds stored in the set-up data. If any of the values exceed a threshold, the algorithm jumps to Block 49 and activates the trigger line 11. If not, the algorithm proceeds to block 44. In Block 44, using instructions from the set-up data and values from Block 41, the algorithm calculates certain calculated power parameter values. For example, the set-up data might contain instructions to multiply an input from an analog voltage sensor by an input from an analog current sensor to form a calculated watts value, and it might contain instructions to double this watts value if a certain digital switch input is closed; this watts value may be representative of the power consumption at the measuring site. Block 44 stores these calculated values in the Accumulated Data RAM 10. Block 46 inspects these calculated values and compares them to thresholds in the set-up data. If any of these values exceed a threshold, the algorithm jumps to Block 49 and activates the trigger line 11. Block 47 inspects the digital input values, and, using instructions from the set-up data, determines if there have been any changes in critical digital values. If critical digital values have changed, the algorithm jumps to Block 49 and activates the trigger line 11. Block 47 may logically combine various digital values according to instructions in the set-up data. Block 48 sets the timing of the loop execution by inserting a delay. For example, if the delay in Block 48 is set to one minute minus the execution times of Blocks 41 through 47, a new set of samples will be acquired once per minute.

Alternated embodiments of the invention may employ more sophisticated interrupt-driven timing algorithms. Alternate embodiments of the invention may employ more sophisticated calculations in Block 45, including Fourier Transforms, Root Mean Square, and minimum-average-maximum calculations. Calculations may incorporate the values of previous samples as well as present sample values. Alternate embodiments may include circuits or algorithms to extract particular signals from the AC power system, including such disturbances as impulses, waveshape faults, high frequency noise, frequency variations, power failures, and the like.

Turning now to FIG. 5, we see a flow diagram of the algorithm executed by the second microprocessor 12 of FIG. 1. The algorithm enters a loop at START 51. Block 52 inspects the facsimile modem 15 for an incoming call. If there is an incoming call, Block 55 answers the call and Block 56 communicates with the calling computer to receive all of the set-up data, some of which is stored in the first RAM 10 for the first microprocessor 7 and employed in Blocks 43, 44, 46, 47 and 48 of the algorithm shown in FIG. 4, and the rest of which is stored in the second RAM 14 for the second microprocessor 12 and employed in blocks 54, 59 and 65 of the algorithm in FIG. 5. The set-up data may include a phone number employed in Block 65, an elapsed time trigger interval employed in Block 54, a report format employed in Block 59, and thresholds and calculation instructions used in Blocks 43, 44, 46, and 47 of FIG. 4. After receiving the set-up data from the calling computer, the algorithm hangs up the phone in Block 57.

If the calling computer requests a report, or if no communication can be established with the calling computer, block 56 automatically generates and sends a facsimile report. This permits a user to trigger a report simply by calling the instrument, waiting for it to answer, then hanging up. No risk of disclosing confidential data to unauthorized users occurs, because any report generated in response to a hang-up is always sent to the telephone number stored in the set-up data RAM 14.

If no incoming call was detected in Block 52, Block 53 inspects the trigger line 11 from the first microprocessor 7 which may have been made active by Block 49 of FIG. 4. If the trigger line 11 is active, Blocks 58 through 66 are executed and a facsimile report is sent. If its not active, Block 54 inspects the real-time clock/calendar 9 of FIG. 1 and compares the elapsed time to an interval value stored in the set-up data 14. If the interval has elapsed, Block 54 causes Blocks 58 through 66 to be executed and a facsimile report is sent. Block 54 allows the set-up data to specify that the instrument should send a facsimile report once each month, for example, whether or not any thresholds have been exceeded. Alternatively, Block 54 can be set up to trigger a report at particular hours each day or on particular days of each week or month.

Blocks 58 through 66 prepare and send a facsimile report. Block 58 acquires the data that was accumulated in the first RAM 10 by Blocks 42 and 45 of FIG. 4. Block 59 acquires the report format from the set-up RAM 14. This report format may specify the format and contents of a cover page, the format, content, and calculation process for a textual summary of the accumulated data 10, and the format, content, labelling, and calculation process for graphical summaries of the accumulated data 10. Block 60 employs bit-mapped font tables, line drawing algorithms, and other well-known techniques to convert the report format from Block 59 and the accumulated data from Block 58 into a bit-mapped image of the report such as the one shown in FIG. 2. Due to memory limitations in the second RAM 14, it may not be possible to construct a bit-map of the entire report, so Block 60 restricts itself to construction of a single line of the report. Blocks 62 and 61 then allow as much of the report as will fit in memory to be constructed. Block 63 compresses the bit-map using any well-known algorithm such as CCITT-3 before passing the data to a facsimile modem 15. Block 64 checks to see if the modem is already on-line to a facsimile receiver. If it is not, Block 65 dials the number specified in the set-up data 14 and establishes communication with a facsimile receiver. If the set-up data specifies, Block 65 may also execute well-known re-try algorithms or alternate-dial algorithms if it is unable to establish communication. Once communication has been established, Block 66 transmits the compressed bit-mapped image to the facsimile receiver then deletes the bit-map from memory thus clearing space for the next section of the report. Block 67 continues this loop until the report is complete, at which time Block 57 hangs up the telephone connection and restores the test loop beginning at Block 52.

Various modifications may be made to the preferred embodiment without departing from the spirit and scope of the invention as defined by the appended claims. Various allocation of the processing requirements between one or more microprocessors may be made.

We claim:

1. An electronic remote data recorder with facsimile output for utility AC power systems comprising:
   a. a first analog measuring apparatus coupled to an AC power line for measuring voltage and current signals through the power line;
   b. a first isolation circuit coupled to the AC power line for isolating appropriate voltage levels from the voltage signal;
   c. a scaling circuit coupled to the first isolation circuit for scaling the signals;
   d. a first filtering circuit coupled to the scaling circuit for filtering unwanted frequencies out of the signals and forming a filtered signal;
   e. an integrating circuit coupled to the first filtering circuit for integrating the filtered signal over time;
   f. a multiplexing circuit coupled to the first isolation circuit, the scaling circuit, the first filtering circuit and the integrating circuit for multiplexing the signals;
   g. an analog-to-digital converter coupled to the multiplexing circuit for converting the signals from analog to digital thereby forming digital signals representing the signals;
   h. a second digital measuring apparatus coupled to switch contacts on the power line for measuring digital signals from the switch contacts;
   i. a second isolation circuit coupled to the second digital measuring apparatus for isolating appropriate voltages from the digital signals;
   j. a second filtering circuit coupled to the second isolation circuit for filtering out frequencies not of interest from the digital signals;
   k. a level shifting circuit coupled to the second filtering circuit for shifting the level of the digital signals to an appropriate level;
   l. a digital multiplexer coupled to the second isolation circuit, the second filtering circuit and the level shifting circuit for multiplexing the digital signals;
   m. a first microprocessor coupled to the analog-to-digital converter and the digital multiplexer;
   n. a first RAM coupled to the first microprocessor for storing system data and accumulated measurement data;
   o. a first ROM coupled to the first microprocessor for storing data and instructions used by the first microprocessor;
   p. a real-time clock and calendar coupled to the first microprocessor for keeping the current time and date accessible by the first microprocessor;
   q. a second microprocessor coupled to the first microprocessor, the first RAM and the real-time clock and calendar for issuing a report of the accumulated measurement data when triggered by the first microprocessor;
   r. a second RAM coupled to the second microprocessor for storing setup and system data and a format for the report;
   s. a second ROM coupled to the second microprocessor for storing data and instructions used by the second microprocessor; and
   t. a facsimile modem coupled to the second microprocessor for communicating with other remote systems for receiving the setup data and for transmitting the accumulated measurement data to a remote system periodically or upon a trigger condition.

* * * * *